(12) United States Patent
Nguyen et al.

(10) Patent No.: US 12,067,029 B2
(45) Date of Patent: Aug. 20, 2024

(54) APPARATUS AND METHOD FOR MANAGING AND COLLECTING METADATA

(71) Applicant: ELECTRONICS AND TELECOMMUNICATIONS RESEARCH INSTITUTE, Daejeon (KR)

(72) Inventors: Chau Minh Nguyen, Daejeon (KR); Hee Sun Won, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 45 days.

(21) Appl. No.: 17/507,779

(22) Filed: Oct. 21, 2021

(65) Prior Publication Data

US 2022/0179875 A1    Jun. 9, 2022

(30) Foreign Application Priority Data

Dec. 9, 2020  (KR) .................. 10-2020-0171563
Apr. 7, 2021  (KR) .................. 10-2021-0045214

(51) Int. Cl.
*G06F 16/00* (2019.01)
*G06F 9/48* (2006.01)
*G06F 16/215* (2019.01)
*G06F 16/25* (2019.01)

(52) U.S. Cl.
CPC .......... *G06F 16/258* (2019.01); *G06F 9/4881* (2013.01); *G06F 16/215* (2019.01)

(58) Field of Classification Search
None
See application file for complete search history.

(56) References Cited

U.S. PATENT DOCUMENTS

| | | | |
|---|---|---|---|
| 7,801,894 B1 | 9/2010 | Bone et al. | |
| 8,918,412 B1* | 12/2014 | Jesurum | H04L 67/56 707/760 |
| 10,896,172 B2 | 1/2021 | Dageville et al. | |
| 2003/0074358 A1* | 4/2003 | Sarbaz | H04L 41/0226 |
| 2010/0161657 A1 | 6/2010 | Cha et al. | |

(Continued)

FOREIGN PATENT DOCUMENTS

| | | |
|---|---|---|
| CN | 110232049 A | 9/2019 |
| KR | 20200103661 A | 9/2020 |

*Primary Examiner* — Bai D Vu
(74) *Attorney, Agent, or Firm* — Rabin & Berdo, P.C.

(57) ABSTRACT

Disclosed is an apparatus for metadata management and collection, which includes a settings managing unit that generates setting information of data obtained from a data source, a source managing unit that generates source information associated with the data source, a job managing unit that starts or stops a data collection job based on the source information, an object collecting unit that requests an external system for a list of metadata based on the setting information and the source information, a metadata importing unit that imports metadata from the list of the metadata based on the setting information and the source information, a data downloading unit that downloads target metadata of the imported metadata based on the setting information and the source information, and a queue managing unit that generates a data queue depending on a request of the job managing unit.

5 Claims, 3 Drawing Sheets

(56) References Cited

U.S. PATENT DOCUMENTS

| | | | |
|---|---|---|---|
| 2013/0173539 A1* | 7/2013 | Gilder | G06F 16/273 |
| | | | 707/610 |
| 2014/0181130 A1 | 6/2014 | Davis | |
| 2015/0193428 A1* | 7/2015 | Lim | G06F 40/30 |
| | | | 704/9 |
| 2018/0307856 A1 | 10/2018 | Nguyen et al. | |
| 2019/0317919 A1 | 10/2019 | Park et al. | |
| 2019/0324972 A1 | 10/2019 | Karpistsenko et al. | |
| 2019/0332696 A1 | 10/2019 | Chen et al. | |
| 2020/0301945 A1 | 9/2020 | Rehal | |
| 2020/0349130 A1* | 11/2020 | Bracholdt | G06F 16/2282 |

* cited by examiner

APPARATUS AND METHOD FOR MANAGING AND COLLECTING METADATA

CROSS-REFERENCE TO RELATED APPLICATIONS

This application claims priority under 35 U.S.C. § 119 to Korean Patent Application Nos. 10-2020-0171563 filed on Dec. 9, 2020 and 10-2021-0045214 filed on Apr. 7, 2021, in the Korean Intellectual Property Office, the disclosures of which are incorporated by reference herein in their entireties.

BACKGROUND

Embodiments of the present disclosure described herein relate to data management and collection, and more particularly, relate to an apparatus and a method for managing and collecting metadata.

Nowadays, the research and utilization of big data are being actively made. The big data field is bringing numerous innovations as data from various sources such as theorists, system builders, researchers, or designers of application programs are simultaneously accumulated. As the amount of data increases, the exchange and management of information becomes increasingly important. In particular, data systems may comply with different standards and may have different structures. In this case, users interested in data of different systems may be in a difficult situation.

The smart open datahub aims to provide a variety of data-related services to many users with different demands on data processing, access, and storage. Accordingly, the probability of applying the datahub may be greatly reduced without a flexible system for data collection and management.

In general, to increase the probability of applying the datahub, a user may create a module on the datahub to collect data from different systems. However, because the above manner mainly focuses on a specific system(s), various data standards may not be taken into account. In this case, it may be difficult to make function expansion and data collection. In addition, it is difficult to effectively manage collected data because there is no clear model structure for storing a series of data collecting and processing processes and querying the data.

SUMMARY

Embodiments of the present disclosure provide an apparatus and a method for metadata management and collection at a smart open datahub.

According to an embodiment, an apparatus for metadata management and collection includes a settings managing unit that generates setting information of data obtained from a data source, a source managing unit that generates source information associated with the data source, a job managing unit that starts or stops a data collection job based on the source information, an object collecting unit that requests an external system for a list of metadata based on the setting information and the source information, a metadata importing unit that imports metadata from the list of the metadata based on the setting information and the source information, a data downloading unit that downloads target metadata of the imported metadata based on the setting information and the source information, and a queue managing unit that generates a data queue depending on a request of the job managing unit.

According to an embodiment, a method for metadata management and collection includes requesting to obtain a list of data sources, starting a data collection job based on source information associated with a one data source among the data sources, requesting an external system for a list of metadata based on setting information and source information of data obtained from the one data source, importing metadata from the list of the metadata based on the setting information and the source information and storing the imported metadata in a first queue, monitoring the first queue and storing target metadata in a second queue based on a result of the monitoring, and listening the second queue and downloading the target metadata based on the setting information, the source information, and a result of the listening.

BRIEF DESCRIPTION OF THE FIGURES

The above and other objects and features of the present disclosure will become apparent by describing in detail embodiments thereof with reference to the accompanying drawings.

DETAILED DESCRIPTION

Below, embodiments of the present disclosure will be described in detail and clearly to such an extent that one skilled in the art easily carries out the present disclosure.

In the detailed description, components described with reference to the terms "unit", "module", "block", "~er or ~or", etc. and function blocks illustrated in drawings will be implemented with software, hardware, or a combination thereof. For example, the software may be a machine code, firmware, an embedded code, and application software. For example, the hardware may include an electrical circuit, an electronic circuit, a processor, a computer, an integrated circuit, integrated circuit cores, a pressure sensor, an inertial sensor, a microelectromechanical system (MEMS), a passive element, or a combination thereof.

Figure 1:
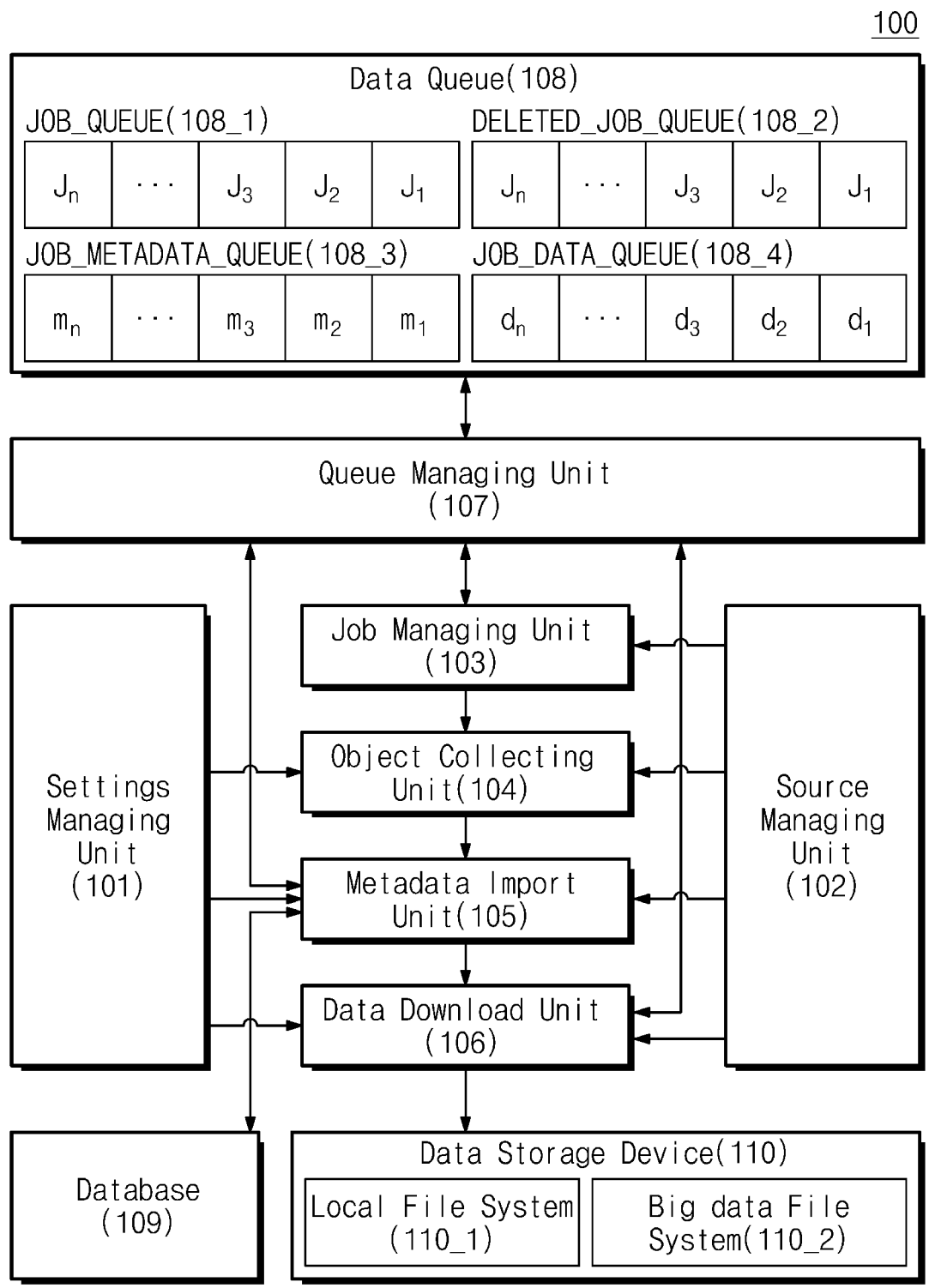
FIG. 1 is a block diagram illustrating a configuration of an apparatus for metadata management and collection, according to an embodiment of the present disclosure.

FIG. 1 is a block diagram illustrating a configuration of an apparatus 100 for metadata management and collection, according to an embodiment of the present disclosure. The apparatus 100 may include data obtained from various sources, and may serve as a data hub that manages a series of information collecting and processing processes for collecting metadata associated with data, which the user wants, from among the data included therein. The apparatus 100 according to an embodiment of the present disclosure may include a settings managing unit 101, a source managing unit 102, a job managing unit 103, an object collecting unit 104, a metadata importing unit 105, a data downloading unit 106, a queue managing unit 107, a data queue 108, a database 109, and a data storage device 110.

For example, the apparatus 100 illustrated in FIG. 1 may be implemented in the form of software or in the form of hardware such as a field programmable gate array (FPGA) or an application specific integrated circuit (ASIC), but the apparatus 100 is not limited to software or hardware. For example, each component of the apparatus 100 may be configured to be present in a storage medium or may be configured to run one or more processors. In other words, each component of the apparatus 100 may be at least one of a components, such as a software component, an object-oriented software component, a class component, and a task component, a process, a function, attributes, a procedure, a subroutine, a segment of a program code, a driver, a firmware, a microcode, a circuit, data, a data structure, tables, arrays, or variables.

The settings managing unit 101 may manage settings (e.g., a data name, a data format, and a data rule) of data obtained from various sources. For example, the data format may include a data type (i.e., indicating whether data are number data or text data), a data length, and a decimal place of data when the data are numeric data, and the data rule may include a data value automatically entered when an input of the data value is omitted, a range of a data value capable of being input, etc. In other words, the settings managing unit 101 may manage settings of data complying with different standards so as to coincide with the standard of the apparatus 100. The settings managing unit 101 may send setting information to the object collecting unit 104, the metadata importing unit 105, and the data downloading unit 106.

The source managing unit 102 may manage the following of various sources capable of obtaining data: a name, an access end point, and a standard of data included therein. The user of the apparatus 100 may request a list of registered data sources from the source managing unit 102 and may select a data source from which the user wants to collect data. The source managing unit 102 may send the data source selected by the user and source information about the selected data source to the job managing unit 103, the object collecting unit 104, the metadata importing unit 105, and the data downloading unit 106.

The job managing unit 103 may manage job information, which is associated with a job that the apparatus 100 performs, such as a start time, an end time, and a current state (e.g., whether the job is being executed or is interrupted (or stopped)). For example, a job may refer to the collection of data, which the user wants, from among the data stored in the apparatus 100. The job managing unit 103 may start a job of collecting data that the user wants, based on the data source and the source information from the source managing unit 102, and may stop a job being executing when the user wants to stop the collection of data.

Also, the job managing unit 103 may determine whether the source information provided from the source managing unit 102 includes invalid information. For example, when the number of data source-related jobs provided from the source managing unit 102 is two or more (i.e., when two or more data collection requests exist at the same time), the job managing unit 103 may determine that the provided source information includes invalid information and may again be provided with a data source and source information from the source managing unit 102. When it is determined that the source information provided from the source managing unit 102 is valid, the job managing unit 103 may request the queue managing unit 107 to generate and manage a queue associated with the job (i.e., a queue associated with data to be collected and metadata thereof).

In addition, when the user requests the interruption of the job, the job managing unit 103 may determine whether the job targeted for the interruption is already in a state of being interrupted. When it is determined that the job targeted for the interruption requested by the user is already in a state of being interrupted, the job managing unit 103 may determine that the request for the interruption of the user is invalid. When it is determined that the request for the interruption of the user is valid, the job managing unit 103 may request the queue managing unit 107 to generate and manage a queue associated with the interruption of the job.

The object collecting unit 104 may request an external system for metadata, based on setting information and source information associated with data that the user wants to collect. For example, the external system may be built based on the data standard and structure such as CKAN, DKAN, or Socrata. The object collecting unit 104 may send a list of metadata provided from the external system to the metadata importing unit 105.

The metadata importing unit 105 may import metadata from the metadata list provided from the object collecting unit 104 based on the setting information and the source information, so as to be stored in the database 109. The metadata importing unit 105 may send the imported metadata to the data downloading unit 106. The data downloading unit 106 may store target metadata, which the user wants, from among the imported metadata in the data storage device 110, based on the setting information and the source information. The metadata importing unit 105 and the data downloading unit 106 may access the data queue 108 through the queue managing unit 107.

The queue managing unit 107 may store, in the data queue 108, jobs of collecting data depending on a request of the job managing unit 103, as a queue. For example, the queue managing unit 107 may store data collection jobs being executing in the data queue 108 as JOB_QUEUE 108_1 and may store interrupted data collection jobs in the data queue 108 as DELETED_JOB_QUEUE 108_2. Also, the queue managing unit 107 may store the imported metadata as JOB_METADATA_QUEUE 108_3 and may finally store target metadata, which the user wants, as JOB_DATA_QUEUE 108_4.

The data queue 108 may include the JOB_QUEUE 108_1 that stores data collection jobs, which are being executing with respect to jobs $J_1$ to $J_n$, based on a request that the queue managing unit 107 receives, the DELETED_JOB_QUEUE 108_2 that stores interrupted data collection jobs, the JOB_METADATA_QUEUE 108_3 that stores metadata $m_1$ to $m_n$, and the JOB_DATA_QUEUE 108_4 that stores metadata $d_1$ to $d_n$ that the user wants. However, the present disclosure is not limited thereto. For example, the data queue 108 may further include different kinds of queues necessary for the apparatus 100 to perform a job.

The database 109 may store metadata that the metadata importing unit 105 imports from the external system. The data storage device 110 may receive and store metadata, which the user wants, from among the metadata through the data downloading unit 106. For example, the data storage device 110 may include storage systems such a local file system 110_1 and a big data file system 110_2, but the present disclosure is not limited thereto.

Figure 2:
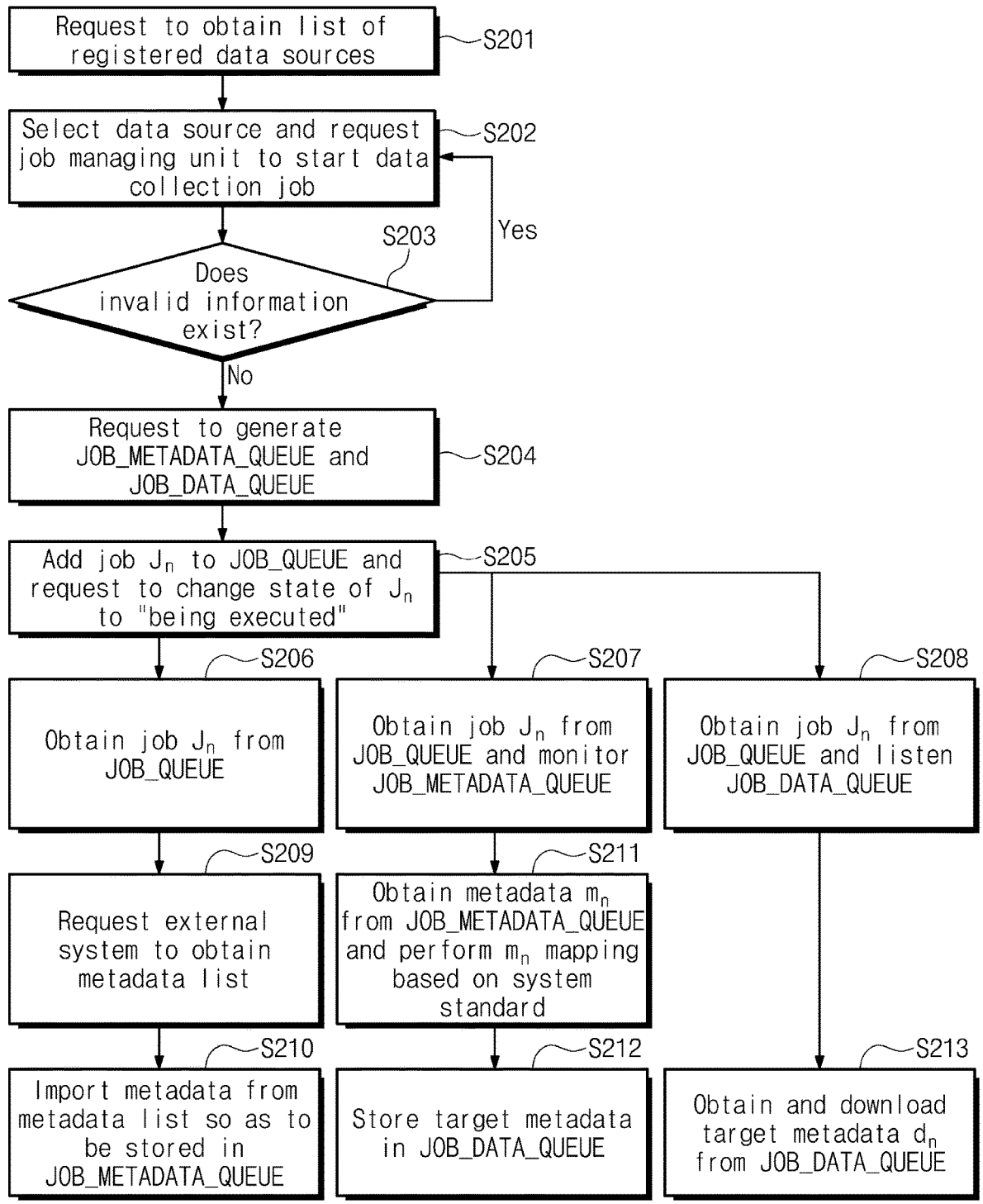
FIG. 2 is a flowchart illustrating a process of starting information collection processing, according to an embodiment of the present disclosure.

FIG. 2 is a flowchart illustrating a process of starting information collection processing, according to an embodiment of the present disclosure. Below, FIG. 2 will be described together with FIG. 1.

In operation S201, the user may send, to the source managing unit 102, a request for obtaining a list of registered data sources. In operation S202, the user may select a data source and may send a request for allowing the job managing unit 103 to start a data collection job based on the selected data source.

In operation S203, the job managing unit 103 may determine whether invalid information is present in a source selected by the user. For example, when the number of data source-related jobs provided from the source managing unit 102 is 2 or more (i.e., when two or more data collection requests exist at the same time), the job managing unit 103 may determine that the provided source information includes invalid information ("Yes" in operation S203) and may return to operation S202 so to be again provided with a data source and source information from the source managing unit 102. When it is determined in operation S203 that invalid information is absent from the source selected by the user ("No" in operation S203), operation S204 may be performed.

In operation S204, the job managing unit 103 may request the queue managing unit 107 to generate the JOB_METADATA_QUEUE 108_3 being a queue storing metadata and the JOB_DATA_QUEUE 108_4 being a queue storing metadata that the user wants. In operation S205, the job managing unit 103 may request the queue managing unit 107 to add a job $J_n$ of collecting data, which the user wants, to the JOB_QUEUE 108_1 and to change a state of the job $J_n$ to "running".

In operation S206, the object collecting unit 104 may obtain the job $J_n$ from the JOB_QUEUE 108_1, may request the settings managing unit 101 for setting information about the job $J_n$, and may request the source managing unit 102 for source information of data associated with the job $J_n$. In operation S207, the metadata importing unit 105 may obtain the job $J_n$ from the JOB_QUEUE 108_1, may request the settings managing unit 101 for the setting information about the job $J_n$, and may request the source managing unit 102 for the source information of data associated with the job $J_n$. Afterwards, the metadata importing unit 105 may start to monitor the JOB_METADATA_QUEUE 108_3. In operation S208, the data downloading unit 106 may obtain the job $J_n$ from the JOB_QUEUE 108_1, may request the settings managing unit 101 for the setting information about the job $J_n$, and may request the source managing unit 102 for the source information of data associated with the job $J_n$. Afterwards, the data downloading unit 106 may start to listen the JOB_METADATA_QUEUE 108_3. Operation S206 to operation S208 may be simultaneously performed with respect to the job $J_n$. Also, the execution of the job $J_n$ may be delayed until a previous job $J_{n-1}$ is processed.

After operation S206 is performed, in operation S209, the object collecting unit 104 may request the external system to obtain a metadata list of data. For example, the metadata list may include a lot of metadata, which is associated with data that the user wants, such as a name of the data and a description of the data. In operation S210, the object collecting unit 104 may import metadata from the metadata list and may request the queue managing unit 107 to store items of the metadata list in the JOB_METADATA_QUEUE 108_3.

After operation S207 is performed, in operation S211, the metadata importing unit 105 may obtain metadata $m_n$ from the JOB_METADATA_QUEUE 108_3 and may store the metadata $m_n$ in the database 109 after performing mapping on the metadata $m_n$ so as to coincide with a system standard (i.e., the standard of the apparatus 100). For example, the "title" attribute of the metadata may be mapped onto a "name" attribute of the apparatus 100. In operation S212, the metadata importing unit 105 may request the queue managing unit 107 to store target metadata, which the user wants, from among the items of the metadata list in the JOB_DATA_QUEUE 108_4, based on a monitoring result in operation S207.

After operation S208 is performed, in operation S213, the data downloading unit 106 may obtain and download target metadata $d_n$, which the user wants, from the JOB_DATA_QUEUE 108_4 based on the setting information, the source information, and a listening result in operation S208, so as to be stored in a specified storage system of the data storage device 110. As such, the apparatus 100 may complete the job $J_n$ of collecting data that the user wants.

Figure 3:
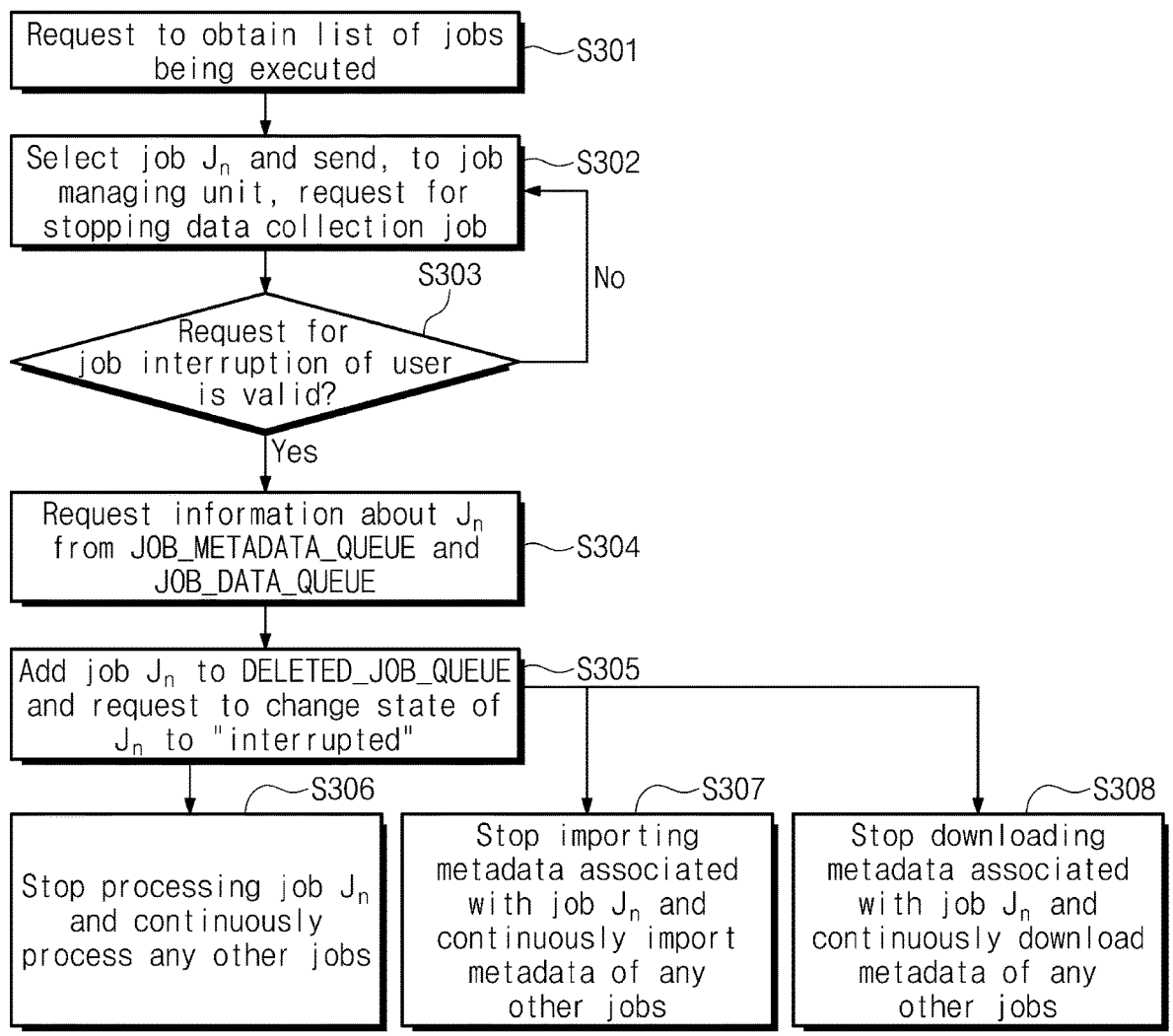
FIG. 3 is a flowchart illustrating a process of stopping information collection processing, according to an embodiment of the present disclosure.

FIG. 3 is a flowchart illustrating a process of stopping information collection processing, according to an embodiment of the present disclosure. Below, FIG. 3 will be described together with FIG. 1.

In operation S301, the user may request the job managing unit 103 to obtain a list of jobs being executed. In operation S302, the user may select the job $J_n$ to be interrupted from the list of the jobs that the job managing unit 103 obtains and may send, to the job managing unit 103, a request for stopping a data collection job.

In operation S203, the job managing unit 103 may determine whether the request for job interruption of the user is valid. For example, when the interruption-requested job is already in a state of being interrupted ("No"), operation S302 may again be performed. For example, when the interruption-requested job is already in a state of being interrupted ("No"), operation S302 may again be performed.

In operation S304, the job managing unit 103 may request the queue managing unit 107 to delete information about the job $J_n$ from the JOB_METADATA_QUEUE 108 and the JOB_DATA_QUEUE 108_4. In operation S305, the job managing unit 103 may request the queue managing unit 107 to add the processing-interrupted job $J_n$ to the DELETED_JOB_QUEUE 108_2 and to change a state of the job $J_n$ to "stopped".

In operation S306, the object collecting unit 104 may stop processing the job $J_n$ and may continuously process any other jobs. In other words, in operation S306, the object collecting unit 104 may stop receiving the metadata list associated with the job $J_n$ from the external system and may be provided with a metadata list associated with any other jobs. In operation S307, the metadata importing unit 105 may stop importing the metadata from the metadata list associated with the job $J_n$ and may import metadata associated with any other jobs. In operation S308, the data downloading unit 106 may stop downloading the metadata associated with the job $J_n$ and may continuously download the metadata associated with any other jobs. Operation S306 to operation S308 may be simultaneously performed with respect to the job $J_n$.

According to an embodiment of the present disclosure, the difficulty that the user experiences due to different standards and structures of metadata management systems may be alleviated.

Also, according to an embodiment of the present disclosure, the access to data that the user wants may be easy, and metadata collecting and processing operations may be efficiently managed.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. An apparatus for metadata management and collection, comprising at least one processor configured to execute program code to implement the following units, the units including the program code and being configured to respond to a user request for a data collection job:
- a settings managing unit configured to generate setting information of data obtained from a data source;
- a source managing unit configured to generate source information associated with the data source;
- a job managing unit configured to start the data collection job based on the source information and in response to the user request and selection of the data source by the user, and to stop the data collection job in response to a user request to stop the data collection job;
- an object collecting unit configured to request an external system for a list of metadata based on the setting information and the source information;
- a metadata importing unit configured to import metadata from the list of the metadata based on the setting information and the source information;
- a data downloading unit configured to download target metadata of the imported metadata based on the setting information and the source information;
- a data storage device configured to store the downloaded target metadata; and
- a queue managing unit configured to generate a data queue to store data collection jobs being executed, depending on a request of the job managing unit, the request corresponding to the data collection job;

wherein
- the metadata importing unit is further configured to store the imported metadata in a database after performing mapping on the imported metadata so as to coincide with a system standard, and
- the data downloading unit is further configured to listen a job metadata queue, obtain and download the target metadata based on a listening result, the setting information and the source information, and store the downloaded target metadata in a specified storage system of the data storage device to complete the data collection job requested by the user.

2. The apparatus of claim 1, wherein the setting information includes a name of the data, a type of the data, and a length of the data.

3. The apparatus of claim 1, wherein the data downloading unit stores the target metadata in the data storage device.

4. The apparatus of claim 1, wherein the data queue is a plurality of queues including:
- a first queue configured to store a job being executed by the job managing unit;
- a second queue configured to store jobs whose executions are interrupted by the job managing unit;
- a third queue configured to store the metadata; and
- a fourth queue configured to store the target metadata.

5. A method for metadata management and collection, comprising:

in response to a request by a user for a data collection job:
- requesting to obtain a list of data sources;
- starting the data collection job based on source information associated with one data source among the data sources;
- requesting an external system for a list of metadata based on setting information and the source information of data obtained from the one data source;
- importing metadata from the list of the metadata based on the setting information and the source information and storing the imported metadata in a first queue;
- monitoring the first queue and storing target metadata in a second queue based on a result of the monitoring; and
- listening the second queue and downloading the target metadata based on the setting information, the source information, and a result of the listening;

wherein the storing of the target metadata in the second queue includes:
- performing mapping on the metadata based on a system standard;

wherein the downloading the target metadata includes storing the downloaded target metadata in a specified storage system of a data storage device to complete the data collection job requested by the user.

* * * * *